(12) United States Patent
Dyor (10) Patent No.: US 7,389,915 B1
(45) Date of Patent: Jun. 24, 2008

(54) FINANCIAL MANAGEMENT SYSTEM

(76) Inventor: Elizabeth R. Dyor, 1910 T. St., NW., #33, Washington, DC (US) 20009

( * ) Notice: Subject to any disclaimer, the term of this patent is extended or adjusted under 35 U.S.C. 154(b) by 1049 days.

(21) Appl. No.: 09/664,587

(22) Filed: Sep. 18, 2000

Related U.S. Application Data (60) Provisional application No. 60/155,102, filed on Sep. 22, 1999.

(51) Int. Cl.
*G06K 5/00* (2006.01)
*G06F 7/00* (2006.01)

(52) U.S. Cl. .................. 235/380; 235/383; 705/26; 707/104.1

(58) Field of Classification Search ............ 705/39, 705/26; 235/375, 380, 383; 707/10, 100, 707/104.1
See application file for complete search history.

(56) References Cited

U.S. PATENT DOCUMENTS

| | | | | |
|---|---|---|---|---|
| 5,664,110 A | * | 9/1997 | Green et al. ................. | 705/26 |
| 5,729,594 A | * | 3/1998 | Klingman ................. | 379/93.12 |
| 5,774,883 A | * | 6/1998 | Andersen et al. .............. | 705/38 |
| 5,884,271 A | * | 3/1999 | Pitroda .......................... | 705/1 |
| 5,890,175 A | * | 3/1999 | Wong et al. ................. | 715/505 |
| 5,899,990 A | * | 5/1999 | Maritzen et al. .............. | 707/4 |
| 5,903,881 A | * | 5/1999 | Schrader et al. ............... | 705/42 |
| 5,930,768 A | * | 7/1999 | Hooban ...................... | 705/27 |
| 6,009,411 A | * | 12/1999 | Kepecs ........................ | 705/14 |
| 6,070,150 A | * | 5/2000 | Remington et al. .......... | 705/34 |
| 6,075,528 A | * | 6/2000 | Curtis ........................ | 715/866 |
| 6,394,341 B1 | | 5/2002 | Makipaa | |
| 6,446,048 B1 | * | 9/2002 | Wells et al. .................. | 705/35 |
| 6,587,835 B1 | * | 7/2003 | Treyz et al. .................. | 705/14 |
| 6,606,606 B2 | * | 8/2003 | Starr .......................... | 705/35 |
| 6,839,692 B2 | * | 1/2005 | Carrott et al. ................ | 705/64 |
| 6,889,205 B1 | * | 5/2005 | Lamm ........................ | 705/40 |
| 6,965,912 B2 | * | 11/2005 | Friedman et al. ............ | 709/203 |
| 6,968,319 B1 | * | 11/2005 | Remington et al. .......... | 705/40 |

OTHER PUBLICATIONS

Neil Munro, "Camtech, Intellect Deliver A$1,600 E-Commerce", Sydney, Feb. 1998, 2 pgs.*

* cited by examiner

*Primary Examiner*—Andrew Joseph Rudy (57) ABSTRACT

A financial management system includes a client terminal having a financial management application and a graphical user interface. The graphical user interface is configured to display transaction data, enable user modification of the transaction data, and transmit modified transaction data to the financial management application. The financial management system additionally includes a commercial web server capable of conducting online financial transactions. The financial management application receives transaction data regarding an online financial transaction upon completion of the financial transaction.

10 Claims, 6 Drawing Sheets

| Purchase Date | 9-18-99 ~301 | | | |
|---|---|---|---|---|
| | | Category | patent ▼ ~305 | |
| Purchase Amount | $150.00 ~302 | | | |
| | | Notes | | |
| Online Payee | dyor.com ~303 | Filing and transaction fee for provisional patent application | | ~306 |
| Credit Card # | 5417 xxx ~304 | | | |
| | Review ~307 | Accept ~308 | Reject ~309 | Repurchase ~310 |

| | Product | Quantity | Price/Product | Product Notes |
|---|---|---|---|---|
| 451 → | Provisional Filing | 2 | $75.00 | More detail ~460 |
| 452 → | Transaction Fee | 2 | $5.00 | service charge ~461 |

400, 401, 402, 403, 404

9-18-99 payment to dyor.com — 405
Summary — 406
Accept — 407
Reject — 408
Repurchase — 409

Figure 4

```
<transaction data>
    <product>
        <number> 1177657</number>
        <name> provisional filing </name>
        <quantity> 1 </quantity>
        <price> 7500 <price>
        <notes> filing of provisional patent
            application and declaration on
            electronic piano, #112</notes>
        <notes> filing of provisional patent
            application and declaration on
            financial management system,
            #113</notes>
    </product>
    <product>
        <number> 1177659</number>
        <name> transaction fee </name>
        <quantity> 2 </quantity>
        <price> 500 <price>
        <notes> service charge </notes>
    </product>
</transaction data>
```

Figure 5

FINANCIAL MANAGEMENT SYSTEM

CROSS REFERENCE TO RELATED APPLICATION

This application claims priority from provisional application 60/155,102 entitled FINANCIAL MANAGEMENT SYSTEM filed Sep. 22, 1999.

FIELD OF THE INVENTION

The present system is designed to facilitate the record keeping associated with online transactions. In particular, this system is designed to increase the amount of transaction data relating to an online purchase of goods or services that is retained by a personal financial management system.

BACKGROUND OF THE INVENTION

For a number of reasons, the use of credit cards, such as MasterCard, Visa, Discover, and American Express, have become many people's primary means for satisfying financial obligations. Currently, when a user is not online, the user generally receives a receipt upon the completion of a credit card transaction which is a physical print out including various transaction data. The transaction data provided on a traditional receipt is generally limited to the date of the transaction, the amount of the transaction, credit card number, and the payee or merchant. For purposes of this application, a merchant is an entity with an online presence that provides goods or services and receives valuable consideration.

In order to ensure that the merchants properly billed the credit card holder, or user for the purposes of this application, many users retain the receipt. A number of computer based financial management systems have been developed having at least a partial purpose of simplifying the method of keeping track of various financial information, such as Intuit's Quicken™ and Microsoft Money™. Among other features, these applications enable a user to enter transaction data, for the purposes of monitoring spending, ensuring accurate charges by merchants, tracking accounts payable, and other reasons.

With certain credit cards, the transaction data provided by the merchant can be compared to the transaction data entered by the user automatically in a function often called reconciling. In Quicken™, for example, a user can download credit card charges from a number of member banks, and accept those transactions that accurately represent the user's purchases. This system saves the user time in data entry and reduces the likelihood of data entry errors. However, the present financial management systems provide neither a mechanism for creating reminders for financial transactions consummated online, nor for directly entering information associated with online transactions. Furthermore, the present monitoring systems store data only about the total transaction amount, but fail to store information about the particular items purchased and the costs of the particular items.

These and other drawbacks exist with current systems.

SUMMARY OF THE INVENTION

An object of the invention is to overcome these and other drawbacks in existing systems.

One aspect of the invention relates to the creation of a computer application that increases the amount of transaction data stored during an online commercial transaction.

Another aspect of the present invention relates to the creation of a transaction data file that can be used to update information stored on a personal financial management program. A transaction data file preferably includes transaction data about the online transaction, including date of purchase, payee identification, product identification, product price, and quantity per product purchased.

Another aspect of the present invention relates to the presentation of information associated with a transaction data file in a Graphical User Interface (GUI). The GUI would render the information stored in the transaction data file. This information could be depicted as the information is stored in the transaction data file, or it could be depicted in accordance with a user profile.

Another aspect of the present invention relates to a software application that copies transaction data. The software application reviews data that is transmitted from a terminal device across a network and copies transaction data to a transaction data file.

Another aspect of the present invention relates to an XML compliant implementation of an online personal financial management program. An XML compliant implementation would allow a user to gain extensive information from a number of different sources, including Personal Digital Assistants (PDAs), merchants, and browsers.

Another aspect of the present invention relates to the ability to repurchase goods and services based on previous purchases. Additionally, users can access the data to conduct analysis on the cost of actual goods and services purchased, instead of tracking only the amount of money spent with various goods and services providers.

According to one embodiment of the present invention, a user completes an online transaction and is presented with a GUI that represents various transaction data. The user is allowed to associate additional data with the transaction data, including a notes field and a category. Upon entering the desired information, the transaction data is submitted to a personal financial management program.

According to one embodiment of the present invention, an application searches for data types that have been associated with transaction data. Once this transaction data has been identified, the data is copied to a transaction data file prior to transmission to the transaction data destination.

Other features and advantages of the present invention will be apparent to one of ordinary skill in the art upon reviewing the detailed description of the present invention.

BRIEF DESCRIPTION OF THE PRESENT INVENTION

DETAILED DESCRIPTION OF THE PREFERRED EMBODIMENT

A preferred embodiment of the financial management system includes a terminal device, a personal financial management program, a commercial web server provided by a merchant capable of conducting online financial transactions, wherein the personal financial management program receives transaction data regarding the online financial transaction upon completion of the financial transaction. The terminal device can be a computer terminal, a Personal Digital Assistant (PDA), an interactive pager, a cell-phone, or other communication device. The personal financial management program could be Quicken™ or Microsoft Money™. A commercial web server could be a server that enables a commercial web site, such as NetGrocer™ or Amazon.com™, to conduct online transactions.

In a preferred embodiment of the present invention, a Financial Assistant is responsible for transmitting transaction data to the personal financial management program, and archiving the transaction data for further purchases and analysis. The Financial Assistant could reside either on the terminal device, or on a server by which the terminal device communicates with the commercial web server. In a preferred embodiment, the Financial Assistant resides on an Internet Service Provider (ISP). This configuration allows the user to implement the present invention without having to update the technology as it is improved, among other benefits. However, it is anticipated that the present invention could be implemented as an application running on the terminal device or on a server associated with the commercial web site. The Financial Assistant may be implemented in any type of executable code, including C++, Java, and VB Script.

Figure 1:
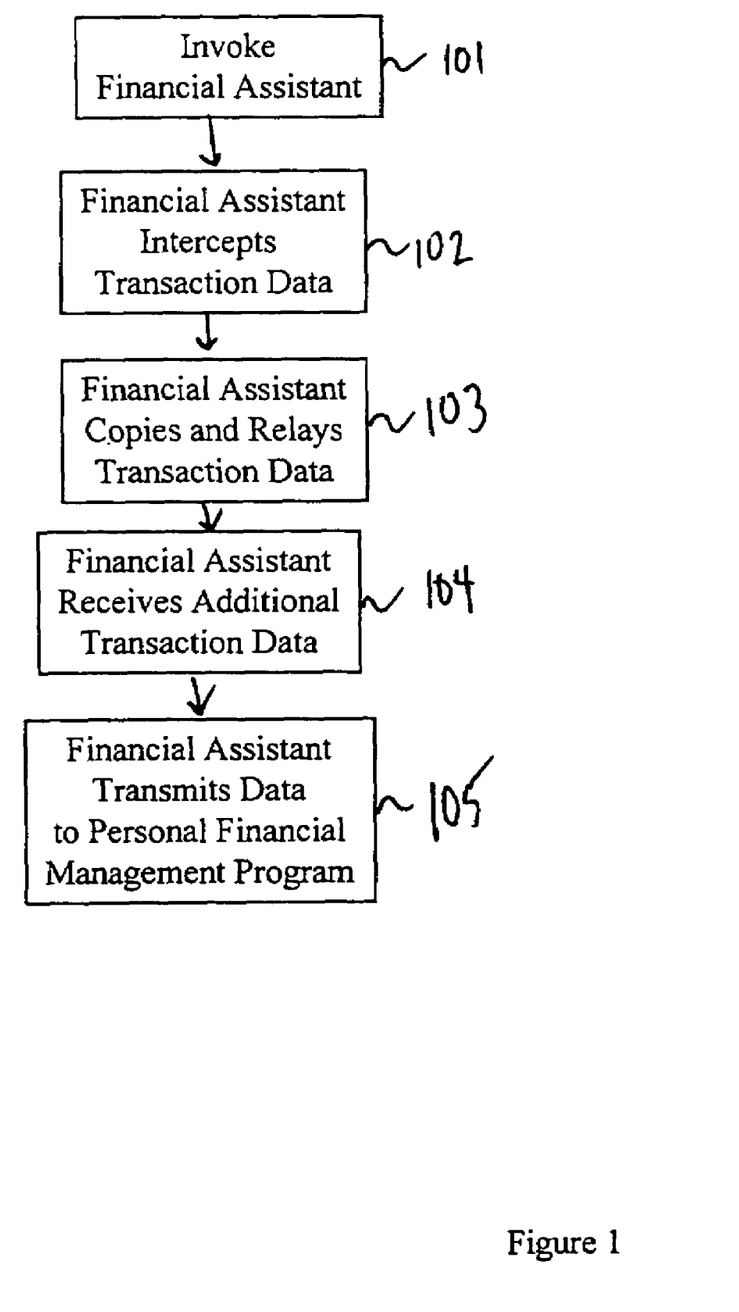
FIG. 1 is a flow chart of a method in which transaction data is transmitted to a personal financial management program.
Figure 1A:
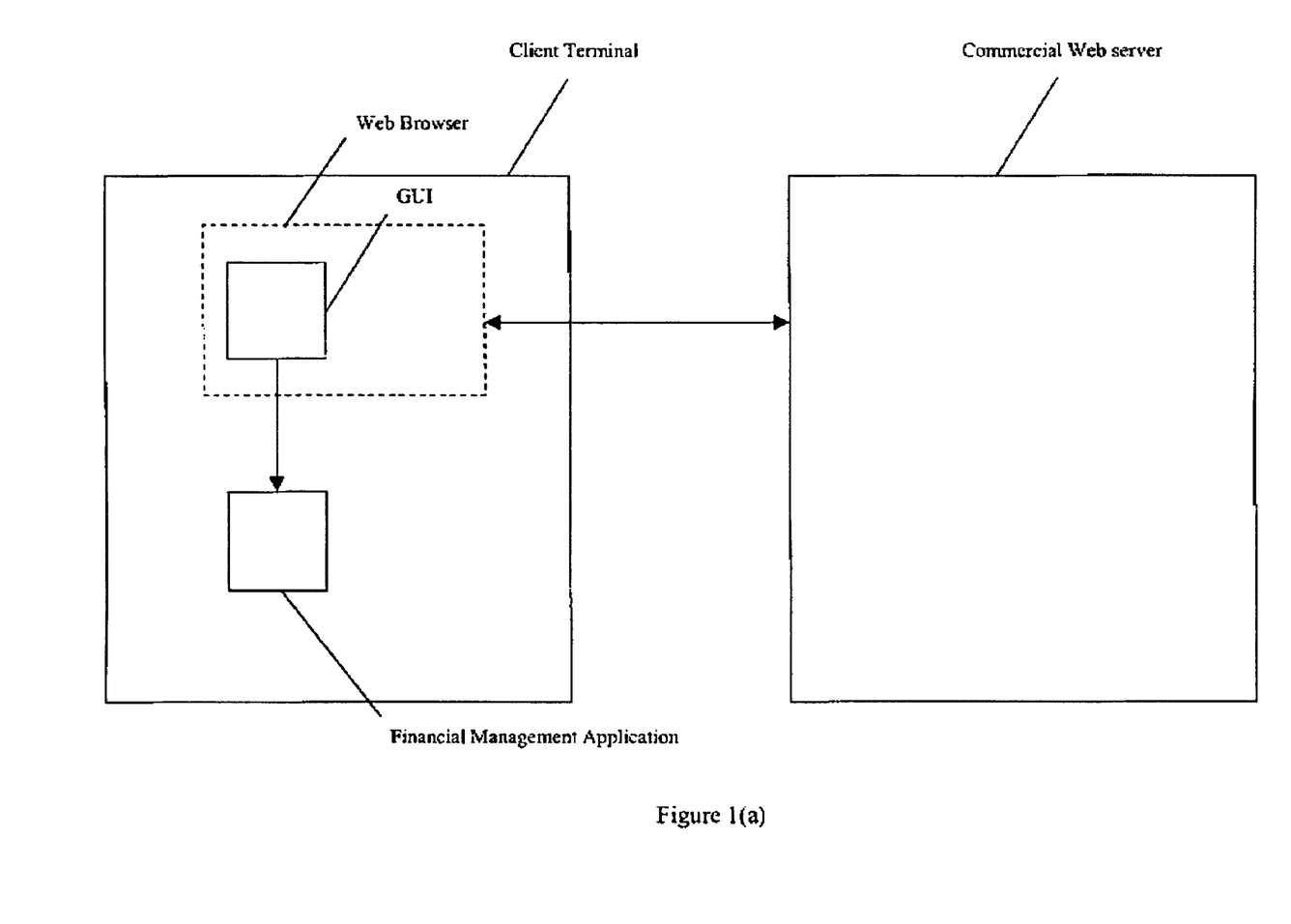

FIG. 1 depicts one implementation of the present invention. In step 101, the Financial Assistant is preferably invoked. This step could be triggered automatically or by user action. In an automatic embodiment, the Financial Assistant could be invoked upon the occurrence of a predetermined event, such as the commencement or conclusion of an online transaction. In a preferred embodiment, the Financial Assistant is invoked upon the transmission of transaction data from a terminal device to a commercial web server. An alternative embodiment would be for the user to visit a third-party web site that performs the Financial Assistant functions, and serves as a conduit through which the user can procure goods and services from the commercial web site.

In step 102, the Financial Assistant intercepts transaction data. Transaction data is data that is transmitted from the terminal device destined for the commercial web server. Transaction data preferably includes purchase amount, a purchase date, a payee, card identification data, and at least one notes field. However, it is not necessary to utilize each of these data types to implement the present invention. Step 102 can be implemented anywhere along the information pathway from terminal device to commercial web server. In a preferred embodiment, the transaction data is intercepted at the ISP.

Once the ISP based Financial Assistant determines that transaction data is being transmitted from the terminal device, the Financial Assistant begins to copy each component of transaction data in Step 103. Once the transaction data has been copied, the transmission to the commercial web server is completed. Whether transmission to the commercial web server happens before or after Steps 104 and 105 is not material to the present invention.

Figure 3:
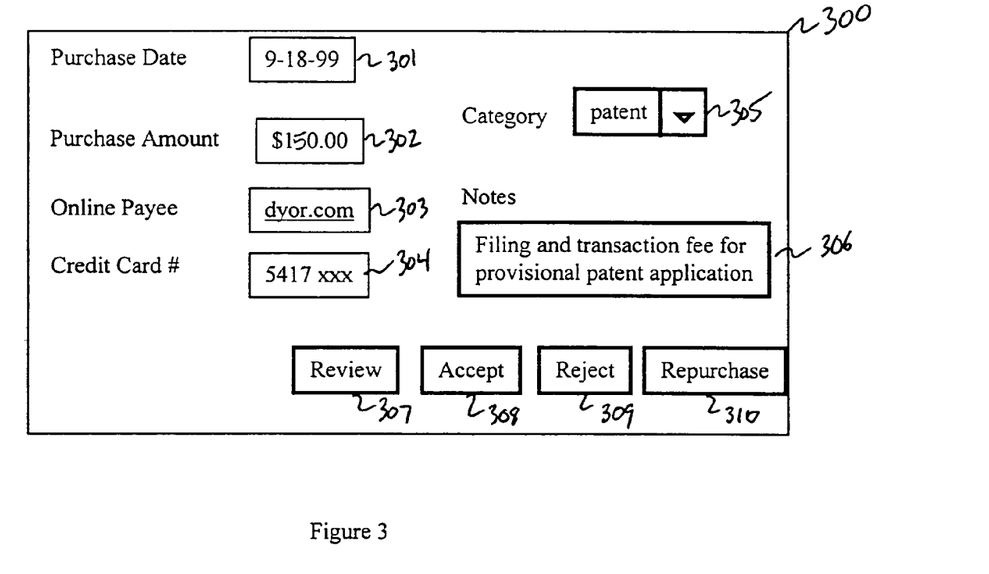
FIG. 3 is a depiction of a summary GUI in accordance with the present invention.

Once the transmission data has been copied, the Financial Assistant receives additional transaction data in Step 104. In a preferred embodiment, this additional transaction data comprises category and remarks. FIG. 3 depicts one embodiment of Step 104 of the present invention. Preferably, the category can be split between two or more categories if needed. This category could have a default value provided by the merchant, or could be based upon previous categories selected for purchases made from the particular merchant. The user can also associate notes with the purchase. In a preferred embodiment, the merchant can provide a default value for the notes, based on the goods or services purchased. The user can supplement this default value, or replace the field with different information.

The final step in this preferred embodiment is the transmission of the information to a personal financial management program Step 105. In this step, the transmission is sent to a personal financial management program and the data is entered in the appropriate fields. Upon completion of Step 105, the transaction data is preferably stored so that the Financial Assistant can later recall the information for conducting additional processing of the transaction data, including repurchasing and statistical analysis.

Figure 2:
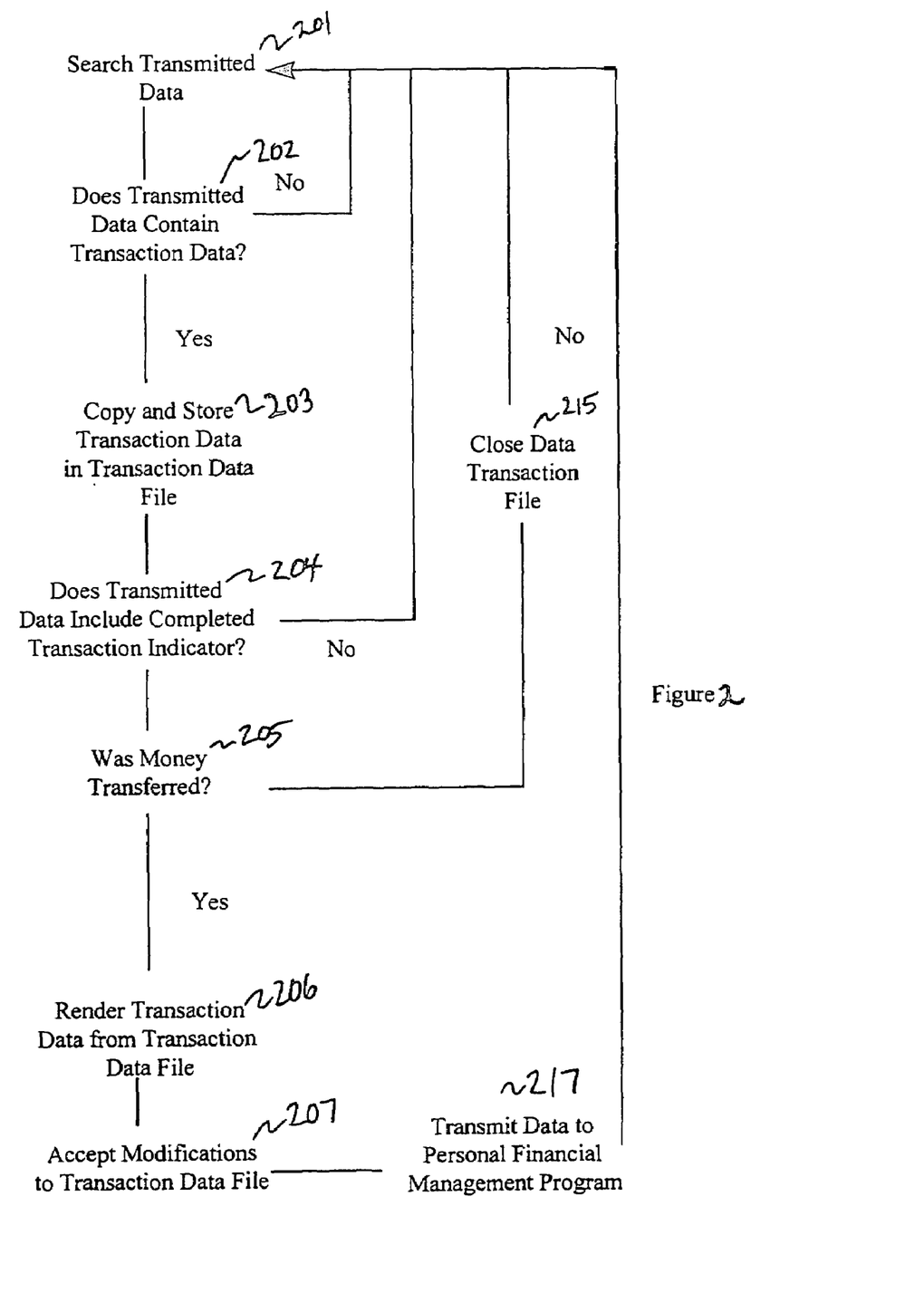
FIG. 2 is a flow chart indicating a method of creating a transaction data file.

FIG. 2 is a block diagram of the preferred embodiment of creating a transaction data file. In the preferred embodiment, a transaction data file is the file that stores transaction data. This transaction data file is preferably created by the Financial Assistant, and delivered to the personal financial management program for analysis.

In Step 201, the transmitted data, or the information from the terminal device to the commercial web server, is searched. In Step 202, the Financial Assistant determines whether the transmitted data contains transaction data. The method in which this Step will be implemented will depend upon the e-commerce solution utilized by the commercial web server.

Because some transaction data is transmitted in a secure manner and not uniform manner, it may be necessary for Financial Assistant to operate at either the terminal device or at the commercial web server, because the transaction data at the ISP may be encrypted. In a preferred embodiment, the ISP will have the ability to detect, copy and store transaction data, even in an encrypted state. This structure could be implemented by, for example, including a non-encrypted indicator that could inform the ISP that the data currently being transmitted includes transaction data. The ISP could then, for example, immediately copy the entire file and relay the transaction data file to the commercial web server, still in a secure state. The ISP server could then decrypt the transaction data file, and proceed with step 203.

If the transmitted data does not contain transaction data, the method returns to Step 201. If the transmitted data does include transaction data, the Financial Assistant copies and stores the transaction data in a transaction data file in Step 203. If a transaction data file is not currently open, then the Financial Assistant may create a new or open an old transaction data file.

In Step 204, the Financial Assistant determines whether the transmitted data includes a completed transaction indicator. If there is no completed transaction indicator, the method returns to Step 201. If there is a completed transaction indicator, the method proceeds to Step 205. In Step 205, the Financial Assistant preferably determines whether the completed transaction indicator also indicated that money or other valuable consideration has been transferred between parties. For example, if a user had added a number of items to an online shopping cart, and then decided not to purchase the items, the transaction would be complete (yes at Step 204), but there was no money transferred (no at Step 205), thereby returning the program to Step 201.

In Step 215, the data transaction file is closed. In a preferred embodiment, the Financial Assistant will at least save any information that the Financial Assistant can determine has been saved by the commercial web server. The data transaction file will be given a unique identifier that will allow the Financial Assistant to recall the associated data transaction file if and when a user elects to proceed with a terminated transaction in which a purchase was not made. Alternatively, the Financial Assistant could delete transaction data files that did not have associated transfers in Step 205.

In Step 206, the Financial Assistant renders data from the transaction data file. The information depicted by the Financial Assistant is initially programmed to be the same as the information provided on a credit card receipt. In a preferred embodiment, the user can modify the initially programmed rendering provided by Step 206.

In Step 207, the user preferably can add additional information, including the category that the charge is supposed to go to and any particular notes for the transaction. In a preferred embodiment, the Financial Assistant provides default values for each of these based on category and notes entries previously made by the user, recommended information provided by the merchant, or other criteria. The user is preferably able to modify the information by either adding to it or replacing it with new information.

FIG. 3 provides a representative summary-level GUI in accordance with the present invention. Fields to 301 to 304 preferably are fixed by the Financial Assistant, whereas Fields 305 and 306 can be manipulated by the user. Summary GUI 300 represents the initial Financial Assistant GUI. In a preferred embodiment, the user can modify this depiction to suit the user's taste. Preferably, the Financial Assistant will include a GUI wizard that will allow users to modify the appearance and functionality of the various GUI's.

Field 303 includes the name of the merchant. In a preferred embodiment, the user can click on the field and be taken to the merchant's web site. Right-clicking on Field 303 will cause a predetermined list of options to drop down in a drop-down hyperlink. Examples of such options would include customer service, parts department, or repurchase from the particular merchant's site.

Field 308 is preferably used to enter the transaction data into the personal financial management program. In a preferred embodiment, activating Field 308 will cause the information in the transaction data file to be copied into the appropriate fields within the personal financial management program. Additionally, by activating Field 308 the information is archived so that a user can later retrieve the transaction data file for submitting repurchase orders or for conducting analysis. The repurchase orders could be conducted through a stand-alone application hosted by the ISP, through the personal financial management program, or through any other implementation that would allow repurchase orders and statistical analysis to be conducted on the transactional data file.

Field 309 is preferably used to prevent the transaction data from being delivered to the personal financial management program. In a preferred embodiment, activating Field 309 will not affect the online transaction, but will affect the record keeping of the online transaction. In a preferred embodiment, the user will be provided with an opportunity to archive the transaction data file or delete the transaction data file.

Field 310 is preferably assigned the function of the repurchase icon. By activating the repurchase icon 310, a user can repurchase the items that were purchased by the associated online transaction. The difference between repurchase icon 310 and the right click option of Field 303 is that the repurchase icon does not necessarily repurchase the goods from the same vendor. In a preferred embodiment, the repurchase key will conduct a search in accordance with a user profile to determine whether the goods and services could be procured from a different provider, or a set of different providers, at a better price. The user profile preferably includes at least one of the following parameters: the amount of time that the user is willing to wait to make the purchase, the type of quality assurance the user demands or desires, privacy policy requirements, preference toward environmentally friendly providers, and other variables.

Preferably, the user will be provided with a repurchase GUI (not shown) that will allow the user to adjust the goods and services to be repurchased. In an alternative embodiment, the repurchase goods and services could be entered into a shopping cart, for example, and the user could purchase additional goods that were not part of the previous purchase.

In a preferred embodiment, the Financial Assistant resides on a server. The Financial Assistant, accordingly, will be operating on behalf of a plurality of users. Information retrieved by the Financial Assistant by one user could be used while researching other user's repurchase requests to decrease the amount of time and processing power required to implement a search.

Figure 4:
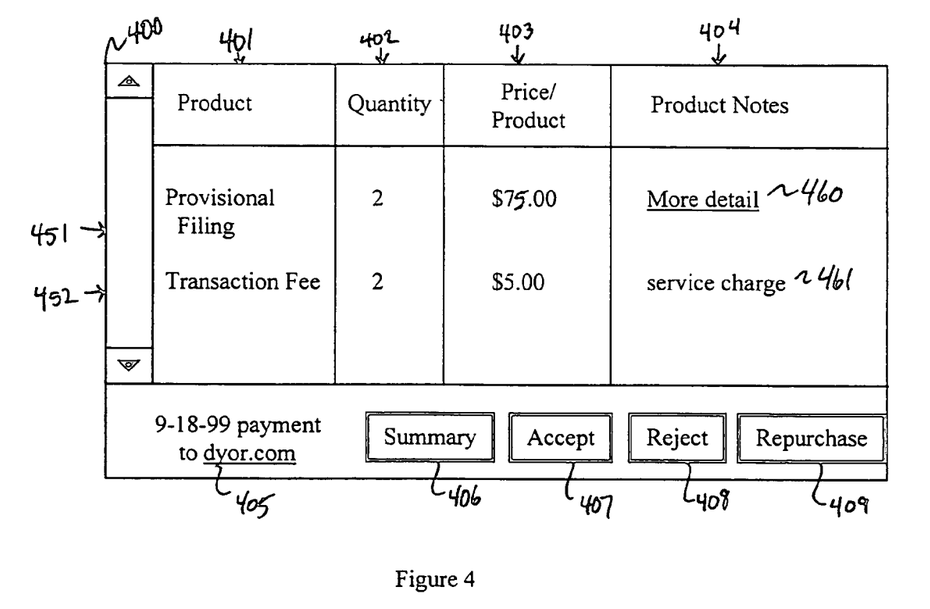
FIG. 4 is a depiction of a item-level GUI in accordance with another present invention.

By activating Field 307, the user is taken to a more detailed description of the transaction data file. FIG. 4 represents an implementation of a preferred embodiment of a lower-level GUI 400 of the present invention. In a preferred embodiment, line-item entries that are the exact same will be represented with their entire associated data represented on the lower-level GUI 400. On the other hand, in a preferred embodiment, line-item entries that in the same product type, but have some different associated data, would be represented as an aggregate with an hyper-link to access more detailed information. Note that product, for the purpose of this application, can mean product or service, and that there is no distinction for the purposes of Financial Assistant between products and services.

In FIG. 4, the provisional filing in row 451 has two non-identical entries. Therefore, Field 460 does not depict the associated data with Row 451, but contains a hyper-link titled "more detail" that will render a further, lower-level GUI (not shown) that would identify a further break-down of the transaction data file. This process would be continued until each of the products listed contained the associated data and no further information was available in the transaction data file.

Row 452 indicates the lowest level at which the transaction fee can be rendered. Because the transaction data file contains no additional information about the "Transaction Fee," the lower-level GUI 400 does not provide a hyper-link for more information. The repurchase key will repurchase all of the items on the displayed GUI in accordance with the GUI. In an alternative embodiment, it is anticipated that the GUI could include a check box for indicating the products that are to be repurchased or those that are not to be repurchased upon the activation of the repurchase icon 409. As above, the user will be provided with a repurchase GUI (not shown) that will allow the user to adjust the goods and services to be repurchased. In an alternative embodiment, the repurchase of goods and services could be entered into a shopping cart, for example, and the user could purchase additional goods that were not part of the previous purchase.

Field 405 is based upon the date and payee in the transaction data file. In a preferred embodiment, by activating the "dyor.com" in field 405 with a right-click, for example, a user would have the opportunity to go to the web dyor.com home page, the customer service department, or repurchase the items listed in Column 401.

Figure 5:
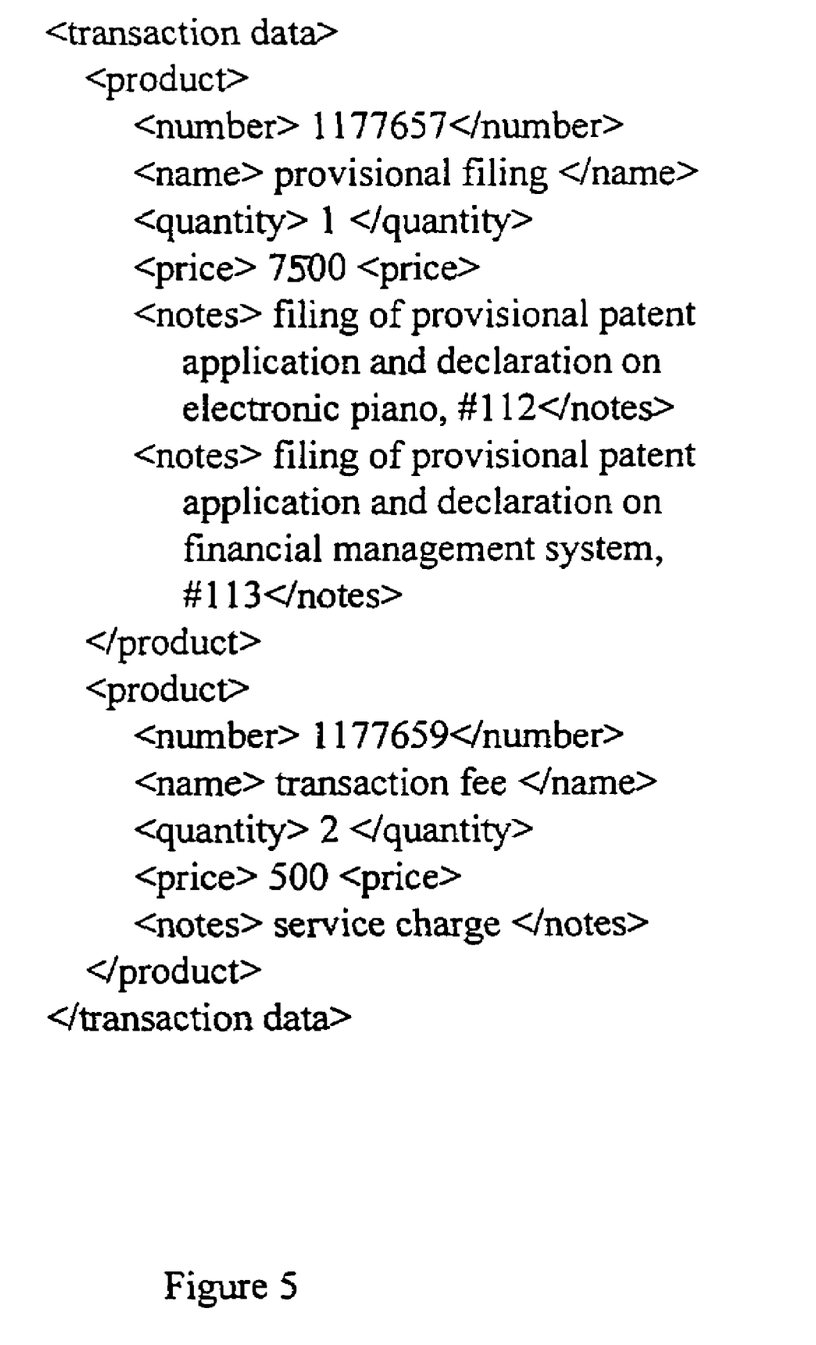
FIG. 5 is an example of possible XML tags that could be stored in a transaction data file.

FIG. 5 represents an excerpt from an embodiment utilizing an XML-compliant transaction data file. In the preferred embodiment, the transaction data file of FIG. 5 would render the summary GUI 300 and the lower level GUI 400. The summary GUI and lower level GUI 400 could be based upon Cascading Style Sheets (CSS) in which the user, or a program developer, could create the GUIs to suit the tastes and needs of the individual user.

In a preferred embodiment, the transaction data file preferably contains only the fundamental transaction data. Specifically, redundant data is not included in the transaction data file. For example, the provisional filings share the same <product>, <name>, <quantity>, and <price> tags, and are different only in their <notes> sections. There is no record of the total price, because this transaction data can be determined from the fundamental transaction data. Information nested within the <product> and </product> tags are associated with the particular product, in accordance with the XML 1.0 Specification.

The product <number> is not unique to a particular vendor. This will allow users to compare the same product between a number of different product providers. Additionally, in a preferred embodiment, the Financial Assistant will be able to compare value between competing brands of products and services. For example, if battery 1 is made of a superior quality than battery 2, a user would generally be willing to pay a premium for the superior quality of battery 1. However, if battery 1 provides for 50% greater useful life than battery 2, but battery 1 is double the price, it likely would be more logical to purchase battery 2. Similar comparisons are possible, although more difficult and more subjective, for virtually every type of product or service a person can buy. Accordingly, it is anticipated that the user, the ISP, third party service providers, or others could provide relationships between similar products and services to determine what products and services will provide the user Financial Assistant with the greatest utility.

In the transaction data field, the notes sections are generally provided based on information provided by the merchant. However, a user can also elect to modify the information, or to establish in a user profile to automatically modify the notes associated with the purchase of a particular good or service or from a particular merchant.

Other embodiments and uses of the invention will be apparent to those skilled in the art from consideration of the specification and practice of the invention disclosed herein. The specification and examples should be considered exemplary only. The scope of the invention is only limited by the claims appended hereto.

What is claimed is:

1. A financial management system comprising:
    a commercial web server provided by a merchant, said commercial web server having a set of transaction processing executable source code configured to process an online transaction when a set of commercial web server transaction data is received, and
    a terminal device comprising:
        a personal financial management application configured to store personal financial management application transaction data including purchase amount data, purchase date data, payee data, and card identification data, and
        a financial assistant comprising:
            a set of graphical user interface generation executable code configured to generate a graphical user interface at the conclusion of the online transaction, the graphical user interface comprising:
                a purchase amount field,
                a purchase date field,
                a payee field,
                a card identification field,
                a category field configured to accept user input, and
                an accept button,
            a set of graphical user interface population executable code that populates the purchase amount field, the purchase date field, the payee field, and the card identification field based on the commercial web server transaction data, and
            a set of personal financial management application transmission executable code that transmits the personal financial management application transaction data from the fields of the graphical user interface to the personal financial management application when the accept button is activated.

2. The financial management system of claim 1, wherein the personal financial management application is Microsoft Money.

3. The financial management system of claim 1, wherein the personal financial management application is Quicken.

4. The financial management system of claim 1, wherein the financial assistant operates within the context of a web browser.

5. The financial management system of claim 1, wherein the financial assistant is part of a web browser.

6. The financial management system of claim 1, wherein a web browser residing on the client terminal renders the graphical user interface.

7. The financial management system of claim 1, wherein a web browser residing on the client terminal renders a graphical user interface which prompts the user to select one of a number of predetermined categories associated with the personal financial management application.

8. The financial management system of claim 7, wherein the web browser creates an associated list of merchants and categories based on previous selections.

9. The financial management system of claim 8, wherein the web browser provides a suggested name based on the name of the merchant.

10. The financial management system of claim 9, wherein the web browser creates an associated list of merchants and categories based on previous selections, and provides a suggested category based upon the associated list if the merchant has previously been associated with a category.

* * * * *